United States Patent

[11] 3,589,032

| [72] | Inventors | Heinz Gretz<br>Hamburg-Bergedorf;<br>Wolfgang Zausch, Hamburg, both of,<br>Germany |
|---|---|---|
| [21] | Appl. No. | 790,228 |
| [22] | Filed | Jan. 10, 1969 |
| [45] | Patented | June 29, 1971 |
| [73] | Assignee | Hauni-Werke Korber & Co. Kg.<br>Hamburg-Bergedorf, Germany |
| [32] | Priority | Jan. 18, 1968 |
| [33] | | Germany |
| [31] | | P 16 57 227.3 |

[54] APPARATUS FOR MANUFACTURING WEBS OF RECONSTITUTED TOBACCO
11 Claims, 6 Drawing Figs.

[52] U.S. Cl. .................................................. 34/162, 34/201, 131/140
[51] Int. Cl. .................................................... F26b 25/06
[50] Field of Search.......................................... 34/201, 243, 162, 236; 131/136, 138, 140; 74/232, 237

[56] References Cited
UNITED STATES PATENTS

| 3,144,930 | 8/1964 | Michels | 74/237 X |
| 3,371,670 | 3/1968 | Camenisch | 131/136 X |
| 3,374,751 | 3/1968 | Werner | 34/201 X |
| 3,402,480 | 9/1968 | Geitz | 34/201 X |

*Primary Examiner*—Charles J. Myhre
*Attorney*—Michael S. Striker

ABSTRACT: Apparatus for the production of webs of reconstituted tobacco employs an endless flexible belt which transports a moist tobacco-containing layer past a drying station and thereupon to a separating station where the resulting web is separated from the upper stretch of the belt. The latter consists mainly of synthetic plastic material which is reinforced by liners or individual filaments of textile, vitreous, plastic and/or metallic material.

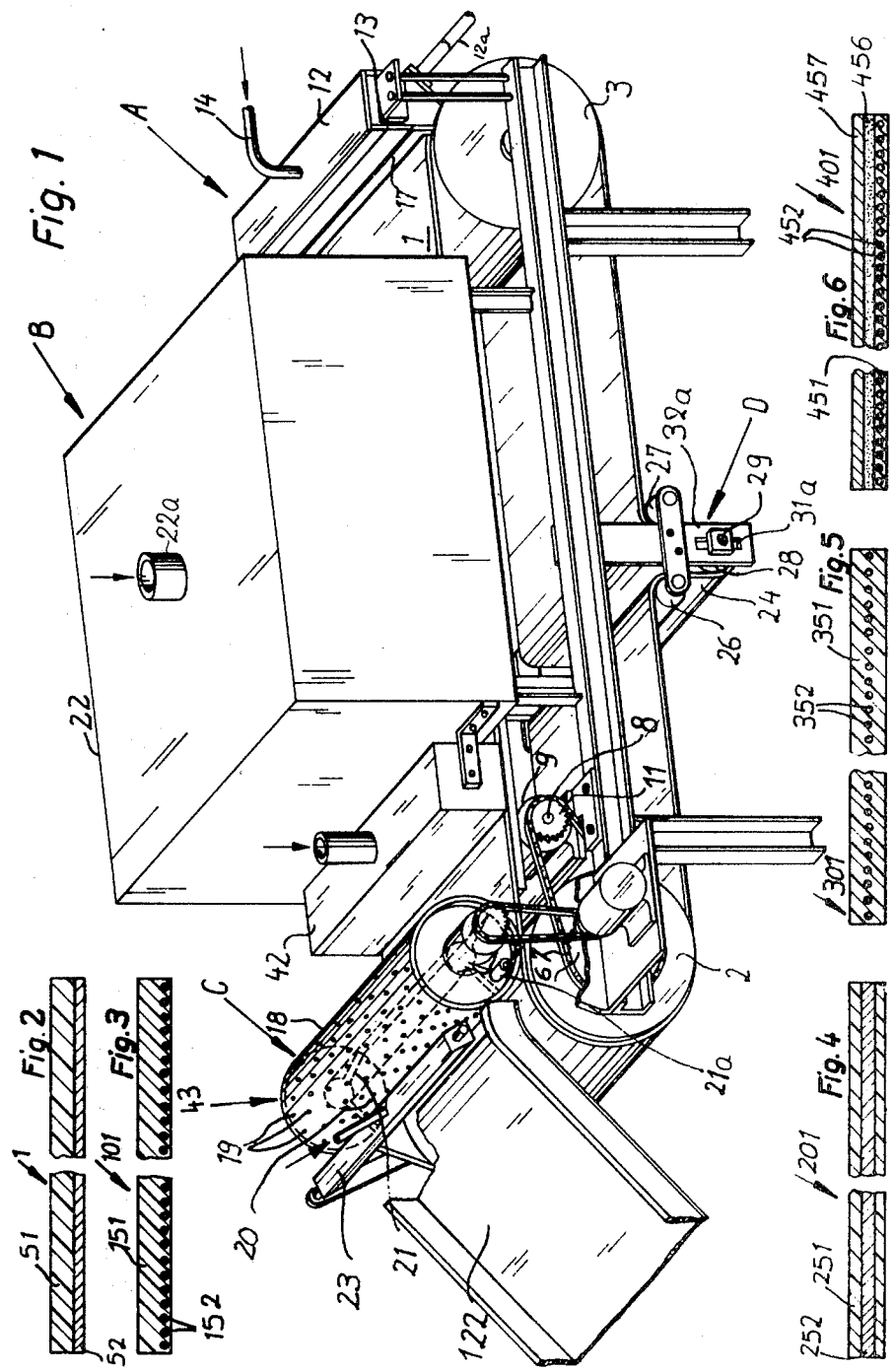

APPARATUS FOR MANUFACTURING WEBS OF RECONSTITUTED TOBACCO

BACKGROUND OF THE INVENTION

The present invention relates to apparatus for the production of webs of reconstituted tobacco, and more particularly to improvements in construction of the tobacco-transporting conveyor in such apparatus.

Conventional apparatus for the manufacture of webs of reconstituted tobacco normally employ relatively wide belts of high-quality rustproof steel which serve to transport a moist pulpy mass containing finely comminuted tobacco particles in a liquid carrier. The upper stretch of the belt transports the mass in the form of a thin layer which moves past a drying station where the layer is relieved of surplus moisture to be converted into a web of reconstituted tobacco which is suited for use as an inner or outer wrapper for cigars or the like. A drawback of steel belts is that they are very sensitive to repeated changes in temperature. Repeated thermal stressing often causes twisting and/or other deformation of a relatively wide belt of rustproof steel so that the belt must be replaced at frequent intervals. Moreover, the initial cost of wide steel belts is very high, mainly because the ends of the belt must be welded to each other in a protective atmosphere and by resorting to costly, bulky and complicated welding equipment which must insure that the welding operation is carried out without causing localized stressing of the welded joint.

SUMMARY OF THE INVENTION

One of the objects of our invention is to provide an apparatus for the manufacture of webs of reconstituted tobacco with a novel conveyor which is less expensive, more reliable and longer lasting than the conveyors of presently known apparatus.

Another object of the invention is to provide a novel belt which can be employed in a conveyor of the just outlined character and to construct and assemble the belt in such a way that it can carry a relatively wide layer of moist tobacco-containing material through zones which are maintained at widely different temperatures.

A further object of the invention is to provide a novel belt which can be used with advantage in presently known apparatus for the manufacture of webs of reconstituted tobacco.

The invention is embodied in an apparatus which is used for the production of webs of reconstituted tobacco wherein a layer of moist tobacco-containing material is transported through and beyond a drying station where the surplus of moisture is expelled so that the layer is converted into a web of reconstituted tobacco. The improvement resides in the provision of a layer-transporting conveyor including at least one endless flexible belt at least the major part or portion of which consists of nonmetallic material, preferably of highly heat-resistant synthetic plastic material, such as silicone rubber or an equivalent material. The belt is preferably reinforced with one or more liners or layers of vitreous, metallic, plastic, textile or like material or with one or more liners of filamentary vitreous, plastic, textile and/or metallic material. The The novel features which are considered as characteristic of the invention are set forth in particular in the appended claims. The improved conveyor itself, however, both as to its construction and the mode of manufacturing and utilizing the same, together with additional features and advantages thereof, will be best understood upon perusal of the following detailed description of certain specific embodiments with reference to the accompanying drawing.

BRIEF DESCRIPTION OF THE DRAWING

FIG. 1 is a perspective view of an apparatus which is utilized for the production of webs of reconstituted tobacco and employs a conveyor which is constructed in accordance with one embodiment of our invention;

FIG. 2 is an enlarged fragmentary transverse sectional view of the belt in the conveyor of FIG. 1;

FIG. 3 is a similar fragmentary transverse sectional view of a second belt;

FIG. 4 is a fragmentary transverse sectional view of a third belt;

FIG. 5 is a fragmentary transverse sectional view of a fourth belt; and

FIG. 6 is a similar fragmentary transverse sectional view of a fifth belt.

DESCRIPTION OF THE PREFERRED EMBODIMENTS

Referring first to FIG. 1, there is shown an apparatus which is utilized for the production of a continuous web of reconstituted tobacco. The apparatus comprises a novel conveyor including an endless belt 1 whose upper stretch is located in a horizontal or nearly horizontal plane and which is trained over two rollers 2 and 3. The shaft of the roller 2 carries a sprocket wheel 6 driven by a chain 7 which is trained over a second sprocket wheel 11 mounted on the output shaft 8 of an electric motor 9. The right-hand end turn of the belt 1 is located at a level below a feeding station A wherein the upper stretch of the belt receives a layer of moist tobacco-containing material which is thereupon transported through a drying zone or station B wherein the surplus moisture is expelled so that the thus dried layer forms a web of reconstituted tobacco. The material of the layer is of pulpy consistency and comprises finely distributed comminuted tobacco particles in a carrier consisting of water and certain other materials. The exact composition of the layer forms no part of the present invention.

The feeding station A accommodates a feeding unit which includes an elongated receptacle or tank 12 accommodating a supply of moist tobacco-containing material supplied thereto by a main supply conduit 14. The ends of the tank 12 are mounted on brackets 13 which are affixed to the main frame of the apparatus by bolts or analogous fasteners. A return conduit 12a is provided to receive surplus material from an overflow opening in the tank 12 so that the latter is constantly filled with moist tobacco-containing material to a predetermined level. The bottom part of the tank 12 is open and is located directly above the upper stretch of the belt 1 so that the parts 1 and 12 define an elongated horizontal outlet or gap 17 for discharge of a continuous layer of moist material. The dimensions of the gap 17 determine the height and the width of the layer.

The drying station B accommodates a drying unit 22 which is installed at a level above the upper stretch of the belt 1 and serves to expel from the layer a desired quantity of moisture to thus convert the layer into a web of reconstituted tobacco. Such web may be used as an inner or outer wrapper for cigars, cigarillos or analogous tobacco products. The exact construction of the drying unit 22 forms no part of the present invention; this unit preferably comprises one or more heat exchangers which heat air and a device which circulates such air along the travelling layer to expel therefrom a desired quantity of moisture and to be thereupon recirculated through the heat exchanger. Atmospheric air can be delivered to the circulating device by an intake pipe 22a, and a suitable discharge pipe (not shown) is provided to permit escape of some moisture laden air prior to reentry into the heat exchanger to thus prevent saturation of air with moisture. A suitable drying unit is disclosed in a copending application Ser. No. 790,227, filed Jan. 10, 1969 of Gretz, entitled "Apparatus for producing webs of reconstituted tobacco" and assigned to the same assignee. It is equally within the purview of our invention to employ other types of drying units, for example, one or more infrared heaters or a combination of hot-air and radiation heaters. Furthermore, the drying unit may comprise one or more contact heaters for the belt 1 and a hot-air or infrared radiation heater.

The drying station B is located upstream of a separating or removing station C where the finished web is separated from the upper stretch of the belt 1, preferably in such a way that the removing unit 43 does not come into bodily contact with the belt. This is in contrast to the operation of presently known removing units which normally scrape the web off the steel belt of the transporting conveyor. The station C further accommodates a moistening unit 42 which might be necessary under certain circumstances when the drying unit 22 expels too much moisture or when the removing operation can be carried out with greater facility if the web is moistened again immediately prior to segregation from the belt 1. The moistening unit 42 preferably comprises a transversely extending nozzle having one or more rows of orifices which discharge onto the exposed surface of the web a suitable liquid, for example, water mixed with glycerine or a like softening agent. The removing unit 43 is operated by suction and comprises an elongated hollow suction drum 18 having a cylindrical shell provided with suction ports 19. The interior of the suction drum 18 accommodates a stationary suction chamber 21 which extends along an arc 20 and is open at its underside toward the internal surface of the shell so that the ports 19 travelling along the open underside of the chamber 21 attract the adjoining portion of the web and separate it from the exposed side of the upper stretch of the belt 1. The numeral 21a denotes a pipe which connects the chamber 21 with a suction fan, not shown. The station C further accommodates an air discharging unit which comprises a transversely extending nozzle 23 connected with a hot-air blower (not shown) and provided with one or more rows of orifices which discharge jets of air substantially tangentially to the peripheral surface of the suction drum 18. The latter supplies the web into a takeoff conveyor here shown as a chute 122 which transports the web to a cutting station, to a convoluting station or to another destination.

The lower stretch of the belt 1 travels along a tensioning station D which accommodates a tensioning unit. The latter includes a vertically movable floating roller 28 which is installed between two stationary deflecting rollers 26, 27. The lower stretch of the belt 1 travels over the fist deflecting roller 26 and is thereupon trained over the floating roller 28 to form a loop 24 and to thereupon travel over the second deflecting roller 27 back toward the feeding station A. The shaft 29 of the floating roller 28 is guided in two vertical slots 31a provided in two downwardly extending supporting members 32a which are secured to the main frame of the apparatus. The extent to which the belt 1 is tensioned can be regulated by replacing the floating roller 28 with a lighter or heavier roller.

The operation:

The supply conduit 14 and the aforementioned overflow opening of the tank 12 insure that the latter is filled to a predetermined level with a moist tobacco-containing material which is discharged by way of the gap 17 to form a continuous layer travelling lengthwise below and beyond the drying unit 22. The layer can but need not cover the entire upper stretch of the belt 1. The web which emerges at the left-hand end of the drying unit 22 thereupon enters the station C and is separated from the belt 1 by suction ports 19 which travel along the open underside of the suction chamber 21. If necessary, the moistening unit 42 sprays a liquid onto the exposed upper surface of the web before the latter moves into registry with the open underside of the suction chamber 21. Successive increments of the web are supplied into the chute 122 which transports the web to a further processing station. The jets of air issuing from the orifices of the nozzle 23 assist the transfer of the web into the chute 122. The floating tensioning roller 28 insures that the belt 1 is subjected to preferably constant tension irrespective of thermal stresses to which the belt is subjected during travel past the stations A, B and C.

An important feature of our present invention resides in the construction and composition of the belt in the conveyor of the apparatus shown in FIG. 1. At least the major part of this belt consists of nonmetallic material, preferably of synthetic plastic material. One embodiment of the belt is shown in FIG. 2. The major part 51 of this belt 1 consists of synthetic plastic material which forms a relatively thick main liner the underside of which is reinforced with a relatively thin liner 52 of suitable reinforcing material which can be a metal, a plastic, a layer of interlaced or parallel vitreous, plastic, textile or metallic filaments or a combination of such materials. The major part or main layer 51 preferably consists of highly heat-resistant synthetic plastic material, such as silicone rubber. Other plastic materials which can be employed include polyvinyl chloride, polyethylene, polyamide, polyesters, polytetrafluorethylene and related substances. The aforementioned reinforcing liner 52 may consist of linen, jute, hemp, cotton or other filamentary textile material, of metallic filaments (particularly steel wire), glass fibers, or filaments of synthetic plastic material such as polyamide or polyvinyl chloride. Furthermore, the reinforcing liner 52 may consist of a layer of synthetic plastic material whose composition is such that it should not come in direct contact with the web of reconstituted tobacco or with the moist tobacco-containing layer.

FIG. 3 illustrates a second belt 101 which consists mainly of synthetic plastic material forming a main liner 151 which is reinforced at its inner side with longitudinally extending filaments 152 consisting of glass fibers, textile fibers, plastic filaments and/or metallic filaments. The reinforcing material is embedded in the material of the main liner 151. The composition of the main liner 151 can be the same as that of the liner 51, and the reinforcing material can be composed of one or more materials which were mentioned in connection with FIG. 1.

Referring to FIG. 4, there is shown a third endless flexible belt 201 which comprises a major part or main liner 251 of synthetic plastic material. The reinforcing material 252 forms a liner which is embedded in the plastic material of the main liner 251 and preferably forms a body of interwoven or interlaced vitreous, plastic, textile or metallic filaments. The material of the main liner 251 can be the same as that of the liner 51 shown in FIG. 1. It is also possible to make the liner 252 of sheetlike synthetic plastic material which is sandwiched between two sheets of the main liner 251.

The belt 301 of FIG. 5 comprises a centrally located reinforcing liner of metallic, plastic, vitreous or textile filaments 352 embedded in a main liner 351 of synthetic plastic material. The diameters of reinforcing filaments 352 may but not be the same and the main liner 351 may accommodate two or more different types of reinforcing filaments. Also, such filaments may form one or more layers.

The belt 401 of FIG. 6 comprises a major part or main liner 451 of synthetic plastic material which is reinforced with filaments 452 of vitreous, plastic, metallic or textile material, and a metallic outer liner 457 which coats that surface of the main liner 251 which is adjacent to the layer of moist tobacco-containing material during travel along the drying station B. The metallic liner 457 preferably consists of rustproof steel and may be glued to the adjoining surface of the main liner 451 by resorting to a suitable adhesive 456 of known composition. One such adhesive is known under the name "Chemosil" (trademark) and is produced by the Firm Henkel & Co., of Duesseldorf, Germany. The main liner 451 may consist of silicone rubber.

It is clear that the main liner 51, 151, 251, 351 and/or 451 may consist of a material which is not a synthetic plastic, for example, of natural rubber. It is further to be noted that the ratio of thicknesses of various liners shown in FIGS. 2—6 is not necessarily the same as in a finished belt. The thicknesses of certain liners, particularly of reinforcing liners, were exaggerated for the sake of clarity.

The improved conveyor employing one or more endless belts of nonmetallic material or of a material which is predominantly nonmetallic exhibits a number of important advantages. The flexibility of the belt is much higher than that of a belt consisting entirely of rustproof steel or analogous metallic material so that the improved belt is capable of undergoing requisite deformation during travel around the rollers 2, 3 and around the rollers 26, 27, 28 at the tensioning station D.

Moreover, such high flexibility insures that the belt 1, 101, 201, 301 or 401 does not undergo permanent deformation, particularly twisting, which takes place when the apparatus employs a single belt of rustproof steel or other metallic material. The improved belt can be produced at a fraction of the cost of a metallic belt because its ends need not always be welded to each other. For example, such ends can be connected to each other by an adhesive, by sewing or by other mechanical means. Even if a welding operation is necessary, it is much less complicated and less expensive than the welding of a steel belt which must take place in a protective atmosphere. In many instances, welding of the ends of a plastic belt merely involves heating of the ends and pressing of the thus softened ends against each other. At least some of the presently known plastic materials, such as silicone rubber, are capable of withstanding extremely high thermal stresses so that belts consisting of such materials can be used in apparatus employing drying units which heat the travelling layer of tobacco-containing material to a very high temperature in order to insure rapid conversion of the layer into a web. Moreover, a belt of silicone rubber repels certain substances which is a characteristic that can be taken advantage of in separation of the web from the belt at the station C.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What we claim as new and desired to be protected by Letters Patent is set forth in the appended claims.

1. In an apparatus for the production of webs of reconstituted tobacco wherein a layer of moist tobacco-containing material is transported through and beyond a drying station, a combination comprising a layer-transporting conveyor including at least one endless flexible travelling belt at least the major part of which consists of nonmetallic material; and removing means for separating the web from the belt, said removing means being arranged to remove the web while remaining out of direct contact with the belt.

2. A structure as defined in claim 1, wherein said removing means is arranged to remove the web by suction.

3. A structure as defined in claim 2, wherein said removing means comprises a rotary suction drum.

4. In an apparatus for the production of reconstituted tobacco, a combination comprising at least one endless belt consisting at least in part of highly heat-resistant nonmetallic material and arranged to travel past a first, a second and a third station; a feeding device provided at said first station and having means for supplying to said belt a moist tobacco-containing material in the form of a continuous layer which is entrained by and advances with the belt toward said second station; a drying device provided at said second station and having means for heating successive increments of the layer on said belt to an elevated temperature to thereby expel from the layer moisture with attendant conversion of the layer into a continuous web of reconstituted tobacco; and removing means provided at said third station for separating the web from said belt.

5. A combination as defined in claim 4, wherein said belt consists of synthetic plastic material.

6. A combination as defined in claim 4, wherein said nonmetallic material is a synthetic plastic material and further comprising at least one liner of reinforcing material embedded in said plastic material.

7. A combination as defined in claim 4, wherein said nonmetallic material is a synthetic plastic material and has a surface adjacent to the layer of moist tobacco-containing material, said belt further comprising a metallic liner provided on said surface.

8. A combination as defined in claim 4, further comprising a floating tensioning roller resting by gravity on a portion of said belt.

9. A structure as defined in claim 4, wherein said belt has a substantially horizontal upper stretch which transports the layer through and past the drying station and a lower stretch, and further comprising tensioning means for said lower stretch.

10. A combination as defined in claim 4, wherein said belt comprises reinforcing means for said nonmetallic material, said reinforcing means being selected from the group consisting of glass fibers, textile filaments, metallic filaments and plastic filaments.

11. A combination as defined in claim 4, wherein said belt comprises at least one reinforcing liner of synthetic plastic material.